United States Patent
Goel et al.

(10) Patent No.: US 7,130,841 B1
(45) Date of Patent: Oct. 31, 2006

(54) ENABLING A SEARCH FOR BOTH LOCAL AND REMOTE ELECTRONIC CONTENT

(75) Inventors: Surendra Goel, Falls Church, VA (US); Thomas E. Donaldson, Falls Church, VA (US)

(73) Assignee: America Online, Inc., Dulles, VA (US)

( * ) Notice: Subject to any disclaimer, the term of this patent is extended or adjusted under 35 U.S.C. 154(b) by 331 days.

(21) Appl. No.: 09/917,675

(22) Filed: Jul. 31, 2001

(51) Int. Cl.
G06F 17/30 (2006.01)
(52) U.S. Cl. .............. 707/3; 707/6; 707/10; 707/104.1; 709/219
(58) Field of Classification Search ........... 707/1–10, 707/100–104.1, 200–206; 709/200, 203, 709/217, 219
See application file for complete search history.

(56) References Cited

U.S. PATENT DOCUMENTS

| | | | |
|---|---|---|---|
| 5,721,906 A | 2/1998 | Siefert | 707/9 |
| 5,987,446 A * | 11/1999 | Corey et al. | 707/3 |
| 5,991,760 A * | 11/1999 | Gauvin et al. | 707/10 |
| 5,991,791 A | 11/1999 | Siefert | 709/100 |
| 6,026,403 A | 2/2000 | Siefert | 707/10 |
| 6,061,686 A * | 5/2000 | Gauvin et al. | 707/10 |
| 6,081,805 A * | 6/2000 | Guha | 707/5 |
| 6,105,028 A * | 8/2000 | Sullivan et al. | 707/10 |
| 6,163,782 A * | 12/2000 | Singhal | 707/104.1 |
| 6,370,527 B1 * | 4/2002 | Singhal | 707/6 |
| 6,526,440 B1 * | 2/2003 | Bharat | 709/219 |
| 6,643,641 B1 * | 11/2003 | Snyder | 707/4 |
| 2002/0103786 A1 * | 8/2002 | Goel | 707/3 |

OTHER PUBLICATIONS

Yong Meng TEO, An Expert System for Performance Evaluation of UNIX-BASED Computer Systems, 1994, IEEE, 250-254.*
Absolute Search—Desktop Search Tools [online], [retrieved on May 21, 2001]. Retrieved from the Internet <URL:http://www.absolutesearch.go.ro/seachtools.htm>.
ZDNet: ISYS Desktop: Search your PC for anything—ZDNet Downloads [online], [retrieved on May 21, 2001]. Retrieved from the Internet <URL:http://www.zdnet.com/downloads/stories/info/0,10615,001CW9,.html>.
ISYS/Odyssey Development—ISYS SDK—Technical Overview [online], [retrieved on May 21, 2001]. Retrieved from the Internet <URL:http://demo.isysusa.com/ISYSquery/IRL4DA1.tmp/1/doc>.
ISYS/Odyssey Development—ISYS Spider [online], [retrieved on May 21, 2001]. Retrieved from the Internet <URL:http://www.isysdev.com/products/desktopspider.shtml>.
ISYS/Odyssey Development—ISYS Dekstop 5—What's New? [online], [retrieved on May 21, 2001]. Retrieved from the Internet <URL:http://www.isysdev.com/products/desktopnew.shtml>.

(Continued)

Primary Examiner—Shahid Alam
Assistant Examiner—Jean Bolte Fleurantin
(74) Attorney, Agent, or Firm—Fish & Richardson P.C.

(57) ABSTRACT

Performing a search for both local electronic content and remote electronic content based on a single query includes receiving a single query that includes at least one search term. The received search term typically is compared with indexed electronic content that is stored on a local device to derive a first result and with electronic content that is stored on a remote device to derive a second result. The comparison generally occurs automatically in response to the single query. The first result and the second result typically are combined into an amalgamated result that then is displayed.

68 Claims, 3 Drawing Sheets

OTHER PUBLICATIONS

ISYS/Odyssey Development—ISYS Desktop 5—Features and Benefits [online], [retrieved on May 21, 2001]. Retrieved from the Internet <URL:http://www.isysdev.com/products/desktopfeatures.shtml>.

ISYS/Odyssey Development—ISYS Desktop 5 [online], [retrieved on May 21, 2001]. Retrieved from the Internet <URL:http://www.isysdev.com/products/desktop.shtml>.

* cited by examiner

ENABLING A SEARCH FOR BOTH LOCAL AND REMOTE ELECTRONIC CONTENT

TECHNICAL FIELD

This invention relates to performing a search for electronic content.

BACKGROUND

Content may be stored electronically on a local device or a remote device. As such, some search mechanisms have been made available to search the contents of a local device while some other search mechanisms have been made available to search the contents of remote devices.

SUMMARY

In one general aspect, performing a search for both local electronic content and remote electronic content based on a single query includes receiving a single query that includes at least one search term. The received search term typically is compared with indexed electronic content that is stored on a local device to derive a first result and with electronic content that is stored on a remote device to derive a second result. The comparison generally occurs automatically in response to the single query. The first result and the second result typically are combined into an amalgamated result that then is displayed.

Implementations may include one or more of the following features. For example, the local device may include a personal computing device. The received search term may be compared simultaneously with the indexed electronic content stored on the local device and the electronic content stored on the remote device. The amalgamated result may be displayed without indicating whether the amalgamated result was derived from the first result or the second result.

The received search term may be compared based on a single input action by a user. The received search term may be compared automatically in response to the single input action by the user to include performing a first comparison of the received search term with the indexed electronic content stored on the local device and, at a separate time, performing a second comparison of the received search term with the electronic content stored on the remote device. The comparison against content stored on the local device and content stored on the remote device based on a single action received from a user may be performed automatically in a default state such that the user need not pre-select to compare the received search term with both the indexed electronic content stored on the local device and the electronic content stored on the remote device. Additionally or alternatively, the comparison against content stored on the local device and content stored on the remote device based on a single action received from a user may be performed with the user pre-selecting to compare the received search term with both the indexed electronic content stored on the local device and the electronic content stored on the remote device.

In response to the single query, the received search term may be compared with indexed electronic content stored on a first local device and with indexed electronic content stored on a second local device, where the first local device and the second local device may be networked in a local area network.

An index may be created based on the electronic content stored on the local device, where the received search term then may be compared with the index. The index may be created at an event pre-designated by a user of the local device. Additionally or alternatively, the index may be created on-demand in response to an action by a user of the local device.

An inverted index may be created based on the electronic content stored on the local device, where the received search term then may be compared with the inverted index.

An index may be created based on the electronic content stored on the remote device, where the received search term then may be compared with the index. Additionally or alternatively, a local index may be created based on the electronic content stored on the remote device, where the received search term then may be compared with the local index. A local inverted index may be created based on the electronic content stored on the remote device, where the received search term then may be compared with the local inverted index.

The received search term may be compared by performing a single comparison of the received search term with both the indexed electronic content stored on the local device and the electronic content stored on the remote device.

In response to an action of a user of the local device, performing the search may further include designating at least one type of indexed electronic content stored on the local device for comparison with the received search term. Additionally or alternatively, in response to an action of a user of the local device, performing the search may further include designating at least one file location of the indexed electronic content stored on the local device for comparison with the received search term.

These general and specific aspects may be implemented using a system, a method, or a computer program, or any combination of systems, methods, and computer programs.

Other features and advantages will be apparent from the description and drawings, and from the claims.

DESCRIPTION OF DRAWINGS

Like reference symbols in the various drawings indicate like elements.

DETAILED DESCRIPTION

Figure 1:
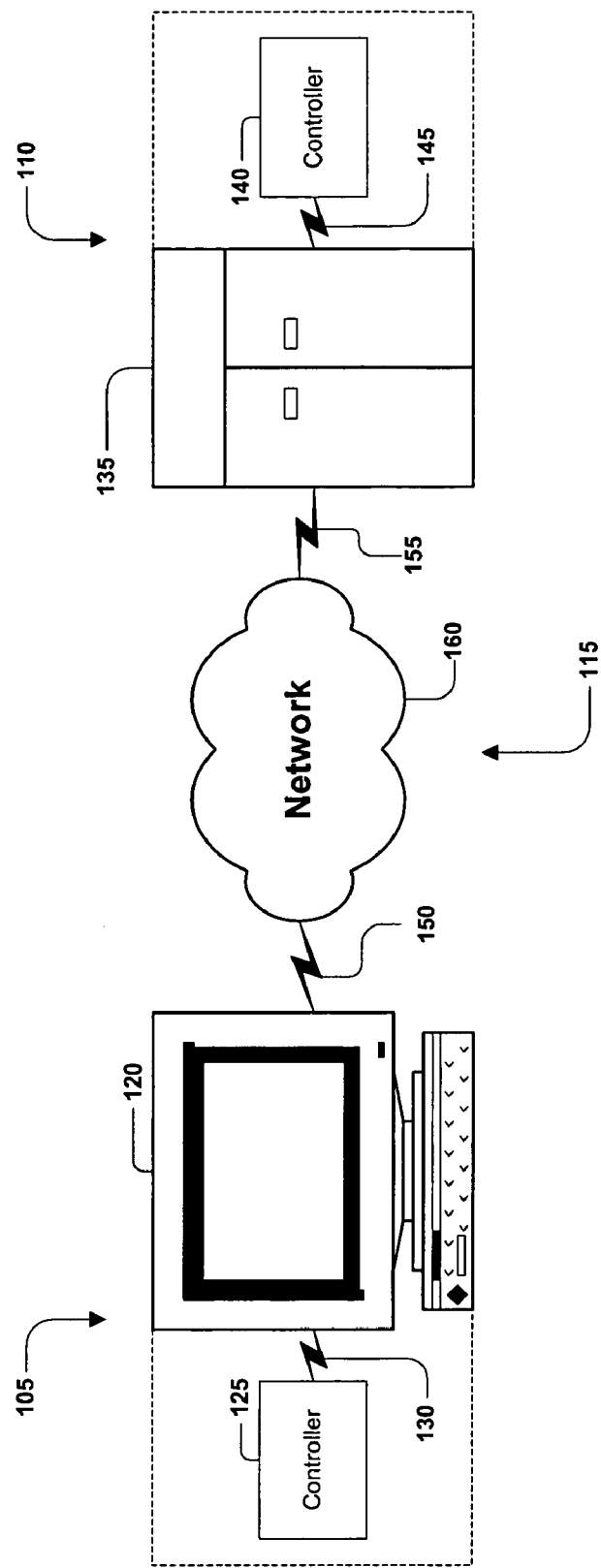
FIG. 1 is a block diagram of a communications system.
Figure 2:
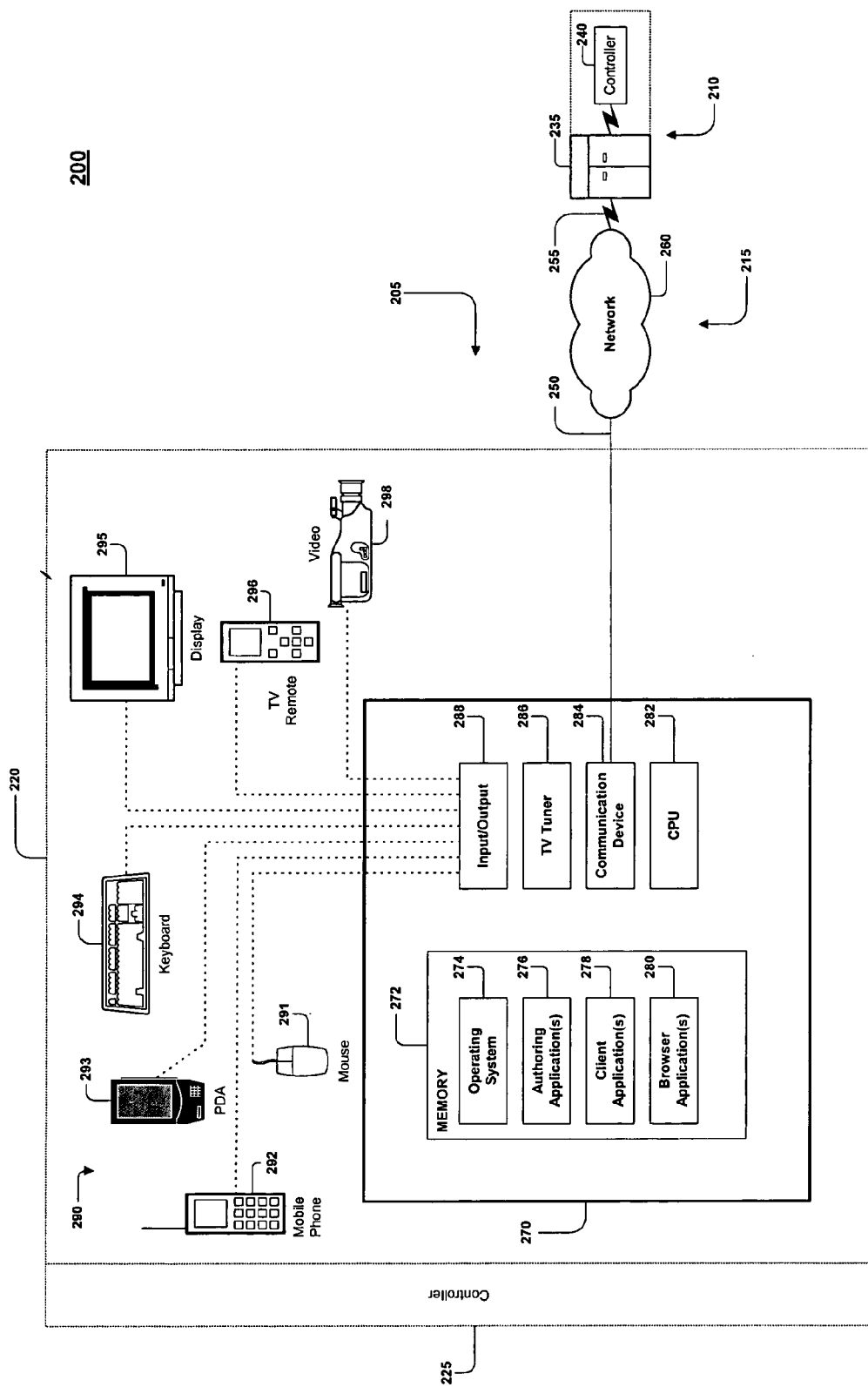
FIG. 2 is an expansion of the block diagram of FIG. 1.

For illustrative purposes, FIGS. 1 and 2 describe a communications system that implements techniques for transferring electronic data. For brevity, several elements in the figures described below are represented as monolithic entities. However, as would be understood by one skilled in the art, these elements each may include numerous interconnected computers and components designed to perform a set of specified operations and/or dedicated to a particular geographical region.

Referring to FIG. 1, a communications system 100 is capable of delivering and exchanging data between a local personal computing system 105 (hereinafter "local system 105") and a remote computing system 110 (hereinafter "remote system 110) through a communications link 115. The local personal computing system 105 typically includes one or more personal computing devices 120 and/or personal computing controllers 125, and the remote computing system 110 typically includes one or more remote computing devices 135 and/or remote computing controllers 140. For example, the local personal computing system 105 or the remote computing system 110 may include one or more general-purpose computers (e.g., personal computers), one or more special-purpose computers (e.g., devices specifically programmed to communicate with each other and/or the local personal computing system 105 or the remote system 110), or a combination of one or more general-purpose computers and one or more special-purpose computers. The local personal computing system 105 and the remote computing system 110 may be arranged to operate within or in concert with one or more other systems, such as, for example, one or more LANs ("Local Area Networks") and/or one or more WANs ("Wide Area Networks").

The personal computing device 120 (or the remote computing device 135) is generally capable of executing instructions under the command of a personal computing controller 125 (or a remote computing controller 140). The personal computing device 120 (or the remote computing device 135) is connected to the personal computing controller 125 (or the remote computing controller 140) by a wired or wireless data pathway 130 (or pathway 145) capable of delivering data.

The personal computing device 120, the personal computing controller 125, the remote computing device 135, and the remote computing controller 140 each typically include one or more hardware components and/or software components. A local system may include a personal computing device, such as, for example, a personal computer (e.g., a laptop computer, a notebook computer, or a desktop computer), a workstation, and a personal digital assistant (PDA) that may have access to a local storage device, such as, for example, a hard drive, a zip drive, a digital versatile disk (DVD), a compact disk (CD), a floppy disk, and a local file server acting as a local storage device, and may communicate and share resources (e.g., a local file server or a local library) with other personal computing devices through a network (e.g., a LAN). A remote system may include devices (e.g., a workstation, a server, a caching device) capable of being accessed by the local device through a non-local delivery network, such as, for example, a WAN or the Internet, or that are accessible through a service provider, such as, for example, an Application Service Provider (ASP) or a data store accessed through or maintained by an Internet Service Provider (ISP), or through a caching device of an ASP or an ISP. The personal computing device 120 may include a client device and the remote computing device 135 may include a host device.

The electronic content stored on the local and/or remote devices may include text files, documents, audio files, video files, e-mail files, directories, sub-directories, cached temporary files (e.g., web pages), downloaded files, data files, or other types of content capable of being stored on the device. In addition, the electronic content stored on the remote device also may include web sites.

An example of the personal computing controller 125 or the remote computing controller 140 is a software application loaded on the personal computing device 120 or the remote computing device 135 for commanding and directing communications enabled by the personal computing device 120 or the remote computing device 135. Other examples include a program, a piece of code, an instruction, a device, a computer, a computer system, or a combination thereof, for independently or collectively instructing the personal computing device 120 or the remote computing device 135 to interact and operate as described. The personal computing controller 125 and the remote computing controller 140 may be embodied permanently or temporarily in any type of machine, component, physical or virtual equipment, storage medium, or propagated signal capable of providing instructions to the personal computing device 120 or the remote computing device 135. The personal computing controller 125 may include a client controller and the remote computing controller 140 may include a host controller.

The communications link 115 typically includes a delivery network 160 capable of enabling direct or indirect communication between the local personal computing system 105 and the remote computing system 110, irrespective of physical separation. Examples of a delivery network 160 include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

FIG. 2 illustrates a communication system 200 that includes a local personal computing system 205 communicating with a remote computing system 210 through a communications link 215. Local personal computing system 205 typically includes one or more personal computing devices 220 and one or more personal computing controllers 225 for controlling the personal computing devices 220. Remote computing system 210 typically includes one or more remote computing devices 235 and one or more remote computing controllers 240 for controlling the remote computing devices 235. The communications link 215 may include communication pathways 250, 255 enabling communications through the one or more delivery networks 260.

Examples of each element within the communication system 200 of FIG. 2 are broadly described above with respect to FIG. 1. In particular, the remote computing system 210 and the communications link 215 typically have attributes comparable to those described with respect to the remote computing system 110 and the communications link 115 of FIG. 1, respectively. Likewise, the local personal computing system 205 of FIG. 2 typically has attributes comparable to and may illustrate one possible implementation of the local personal computing system 105 of FIG. 1.

The personal computing device 220 typically includes a general purpose computer 270 having an internal or external storage 272 for storing data and programs such as an operating system (OS) 274 (e.g., Disk Operating System (DOS), Windows™, Windows 95™, Windows 98™, Windows 2000™, Windows NT™, Windows ME™, Windows XP™, OS/2, Mac OS X, Unix, and Linux) and one or more application programs. Examples of application programs include authoring applications 276 (e.g., word processing, database programs, spreadsheet programs, and graphics programs) capable of generating documents or other electronic content; client applications 278 (e.g., America Online (AOL) client, CompuServe client, Instant Message (IM) client, AOL Television (TV) client, and ISP client) capable of communicating with other computer users, accessing various computer resources, and viewing, creating, or otherwise manipulating electronic content; and browser applications 280 (e.g., Netscape's Navigator and Microsoft's Internet Explorer) capable of rendering content such as standard Internet content and email content. Other examples of application programs may include, for example, a Point-to-Point Protocol (PPP) client, a User Datagram Protocol (UDP) client, a Point-to-Point Protocol over Ethernet (PPPoE) client, and a Layer Two Tunneling Protocol (L2TP) client, which may be included as a client application 278 or may be a separate application program used to support other application programs, such as the client applications 278 and the browser applications 280.

The general-purpose computer 270 also includes a central processing unit 282 (CPU) for executing instructions in response to commands from the personal computing controller 225. In one implementation, the CPU 282 executes instructions included in one or more of the application programs installed on the internal or external storage 272 of the general-purpose computer 270. In another implementation, the CPU 282 executes instructions included in application programs externally stored in and executed by one or more device(s) external to the general-purpose computer 270.

The general-purpose computer 270 typically will include a communication device 284 for sending and receiving data. One example of the communication device 284 is a modem, such as a DSL modem, a cable modem, or a satellite modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV tuner 286 for receiving TV programming in the form of broadcast, satellite, and/or cable TV signals. As a result, the personal computing device 220 can selectively and/or simultaneously display network content received by communications device 284 and television programming content received by the TV tuner 286.

The general-purpose computer 270 typically will include an input/output interface 288 to enable a wired or wireless connection to various peripheral devices 290. Examples of peripheral devices 290 include, but are not limited to, a mouse 291, a mobile phone 292, a PDA 293, a keyboard 294, a display monitor 295 with or without a touch screen input, a TV remote control 296 for receiving information from and rendering information to subscribers, and/or an audiovisual input device 298. Other examples may include voice recognition and synthesis devices (not shown).

Although FIG. 2 illustrates devices, such as a mobile telephone 292, a PDA 293, and a TV remote control 296, as being peripheral with respect to the general-purpose computer 270, in another implementation, such devices may themselves include the functionality of the general-purpose computer 270 and operate as the personal computing device 220. For example, the mobile phone 292 or the PDA 293 may include computing and networking capabilities, and may function as a personal computing device 220 by accessing the delivery network 260 and communicating with the remote computing system 210. Furthermore, the local personal computing system 205 may include one, some or all of the components and devices described above, such as, for example, the personal computing device 220 may include a client device.

Figure 3:
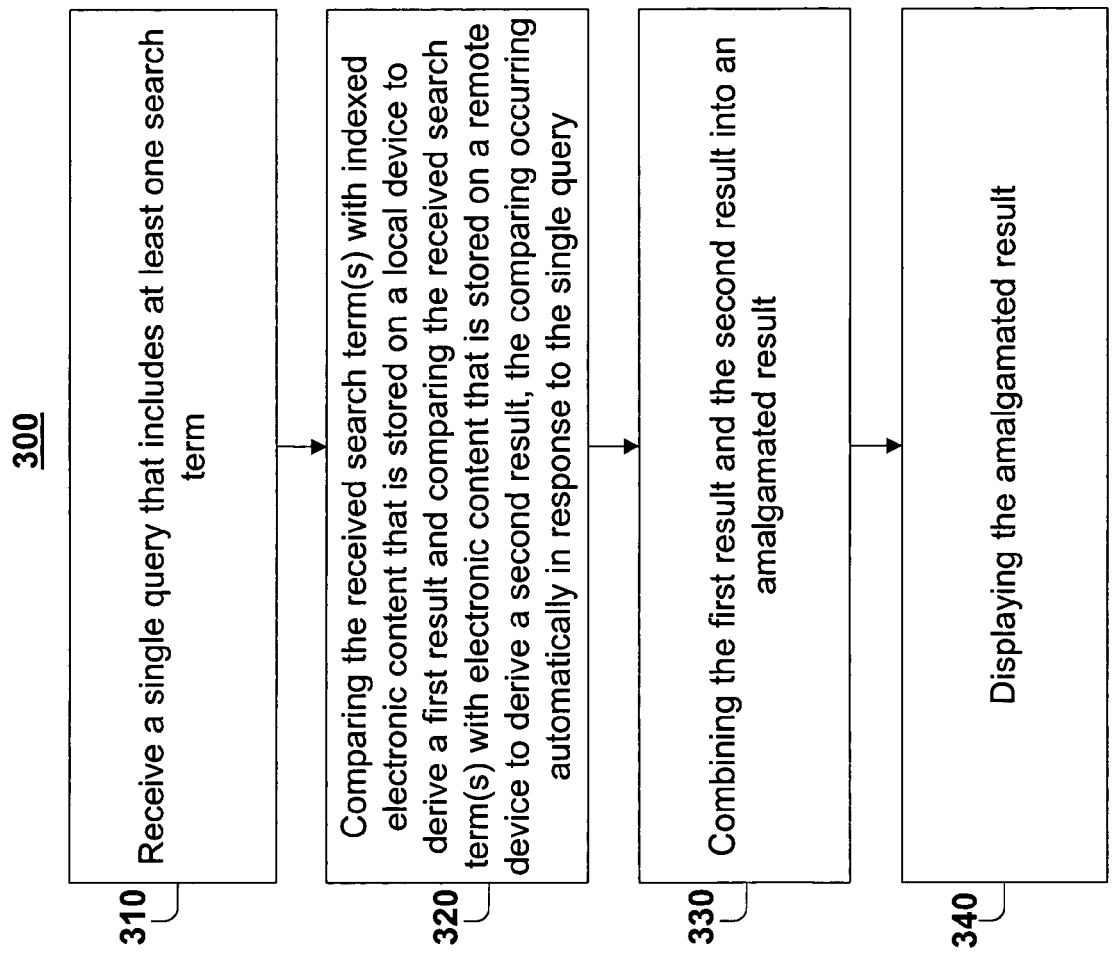
FIG. 3 is a flow chart of an exemplary process for performing a search for both local electronic content and remote electronic content.

FIG. 3 illustrates an exemplary process 300 for performing a search for both local electronic content and remote electronic content based on a single query. Process 300 may be performed by the systems described above with respect to FIGS. 1 and 2. In particular, process 300 may be performed on a local system, such as local personal computing systems 105 and 205, that communicate with a remote system, such as remote computing systems 110 and 210, or which may be accessible through the remote computing system 110 and 210 if not included as part of the remote computing system 110 and 210.

Process 300 generally includes receiving a single query that includes at least one search term (step 310). The received search term typically is compared both with indexed electronic content that is stored on the local system to derive a first result and with electronic content that is stored on the remote system to derive a second result (step 320). The comparison (step 320) generally occurs automatically in response to the single query. The first result and the second result typically are combined into an amalgamated result (step 330) that then is displayed (step 340).

More specifically, for instance, receiving the single query (step 310) may include receiving search terms that may be grouped as a single string or otherwise, by default or according to user specification. A single query may be distinguished from multiple queries in that the search term(s) forming the query is/are input by a user at a user interface only once to perform a search of both local electronic content and remote electronic content. Thus, when using a single query, multiple queries are not necessary to search for both local and remote electronic content. Moreover, a single input action is required of the user in order to initiate and/or perform a search both of local and remote electronic content.

Search terms generally include text defined by letters and/or numbers. However, search terms also may include other searchable content, such as symbols, other alphanumeric characters, and geometric constructs (e.g., arcs); Boolean operators (e.g., AND, OR, ADJ, NOT, NEAR) generally used to define relationships between search terms; parentheses and quotation marks generally used to indicate precision and to group search terms; wild card characters (e.g., ? and *) generally used to represent a portion of a search term; and concept operators (e.g., !) generally used to broaden the search term or phrase to a list of related words related to the search term or phrase in order to search using these related words.

The single query (step 310) may be received at the local system through a graphical user interface, or it may be received by that system using some other form of input by the user of the machine (e.g., touch screen or voice command).

Following receipt of the single query including the search term (step 310), the search term typically is compared with electronic content that is stored on the local device to derive a first result and with electronic content that is stored on a remote device to derive a second result (step 320). The comparison of the search term with both of the local electronic content and the remote electronic content may be performed automatically in response to the single query (step 320). Thus, a single query may be the basis for a search both of electronic content stored on the local device and electronic content stored on a remote device. Moreover, a user of the local device is not required to enter separate queries to search both local electronic content and remote electronic content (i.e., one query to search the local electronic content and a second separate query to search the remote electronic content). In this manner, the comparison of the received search term with the local electronic content and the remote electronic content (step 320) may be based on a single action received from a user.

The comparison (step 320) may be based on a single input action received from a user as the result of a default setting, without requiring the user to indicate that the comparison should occur for both local and remote electronic content. Alternatively, the comparison (step 320) may be based on the user indicating that the single query should be used for comparison with both the local and remote electronic content.

Comparing the received search term (step 320) may include simultaneously comparing the received search term with electronic content that has been indexed and stored on the local system (as discussed in greater detail below) and electronic content stored on the remote system, whether indexed or not. Additionally or alternatively, comparing the received search term (step 320) may include performing a single comparison of the received search term with both the indexed electronic content stored on the local device and the electronic content stored on the remote device. Furthermore, comparing the received search term (step 320) may include, as part of the single comparison, performing a first comparison of the received search term with the local electronic content and, at a separate (earlier or later) time, performing a second comparison of the received search term with the remote electronic content, with each comparison being based on the single query or input action.

In one implementation, comparing the received search term (step 320) in response to the single query may include comparing the received search term with the electronic content stored on multiple local devices that are networked, for example, as part of a local area network, and also comparing the received search term with remote electronic content. Thus, with a single query, a user of one local device may search that local device and other networked local devices for electronic content stored locally (e.g., electronic content stored within the devices that are a part of the local network) and also may search remote electronic content.

Comparing the received search term (step 320) may include using various algorithms, processes, and/or methods to perform the comparison to derive the first and second results. For example, comparing the received search term (step 320) may include using a searching algorithm to search an index (e.g., an inverted index), an exact matching algorithm, keyword matching, other comparison algorithms, or any combination of these. Comparing the received search term (step 320) with the local electronic content may use either the same searching technique or a different searching technique than was or will be used to compare the received search term with the remote electronic content.

Following the generation of first and second results based on the comparison of the received search term against the contents of local and remote devices (step 320), the first result and the second result derived from the comparison typically are combined into an amalgamated result (step 330). The first result and the second result may include an identifier, such as, for example, a hyperlink, a file name, a title, a description, address information, text, characters, symbols, or combinations thereof used to identify or describe the local electronic content and the remote electronic content. In addition to the first and second results including an identifier or as an alternative to an identifier, the first and second results may include the electronic content itself.

Combining the first result and the second result into an amalgamated result (step 330) generally includes comparing the first result and the second result, eliminating duplicates that may occur in both the first and the second result, and arranging the results into a single amalgamated result (e.g., a single list of combined results). Additionally or alternatively, the amalgamated result may include an indicator of whether and which, if any, results are duplicates. When the first result and the second result are combined (step 330), the amalgamated result may include a ranked ordering of the identifiers in the amalgamated result, and/or an indication of source (e.g., local or remote device, or both).

After combining the first result and the second result into an amalgamated result (step 330), the amalgamated result may be displayed (step 340). Displaying the amalgamated result (step 340) may include displaying transparently the first result and the second result. Thus, for a user viewing the displayed amalgamated result, it would be transparent to the user whether a particular identifier in the amalgamated result was from local electronic content, remote electronic content, or both the local electronic content and the remote electronic content. Alternatively, the source of the displayed result may be indicated.

Process 300 may further include creating an index based on the electronic content stored on the local device. In one implementation, comparing the received search term (step 320) may include comparing the received search term with the index to derive a result. Additionally or alternatively, creating the index based on the local electronic content may include creating an inverted index based on the local electronic content. In this instance, comparing the received search term (step 320) may include comparing the received search term with the inverted index to derive a result. Thus, a user of a local device may index the electronic content stored on the local device and search the index to find results for the entered search term.

The index for the local electronic content may be created at an event (e.g., a time or an action) pre-designated by a user of the local device. For instance, the index may be created at a designated time when the local device may be idle and, thus, may be available for devoting necessary resources to creating the index. Additionally or alternatively, the index may be created on-demand in response to an action (e.g., executing an index command, modifying the local electronic content, or creating new local electronic content) by the user of the local device.

The index created for the local electronic content may be based on local electronic content designated for indexing by a user. For example, the user may designate that the local electronic content should be indexed by type, content, and/or location.

Process 300 may further include creating an index based on the electronic content stored on the remote device. In one implementation, comparing the received search term (step 320) may include comparing the received search term with the index to derive a result. Additionally or alternatively, creating the index based on the electronic content stored on the remote device may include creating and/or storing the index locally based on the remote electronic content and searching that index to derive a result in response to the single query. Additionally or alternatively, creating the index based on the electronic content stored on the remote device may include creating and/or storing an inverted index locally based on the remote electronic content and searching the inverted index to derive a result in response to the single query.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for performing a search for both local electronic content and remote electronic content based on a single query, the method comprising:
   receiving a single query that includes at least one search term;
   simultaneously comparing the received search term automatically in response to the single query with indexed electronic content that is stored on a local device to derive a first result and comparing the received search term with electronic content that is stored on a remote device to derive a second result, wherein the local device is a personal computing device;
   combining the first result and the second result into an amalgamated result; and
   displaying the amalgamated result,
   wherein comparing against content stored on the local device and content stored on the remote device is performed automatically in a default state such that the user need not pre-select to compare the received search term with both the indexed electronic content stored on the local device and the electronic content stored on the remote device.

2. The method as in claim 1 wherein the personal computing device includes a general purpose computer having an operating system.

3. The method as in claim 2 wherein the operating system includes a Windows-based operating system.

4. The method as in claim 2 wherein the operating system includes a Unix-based operating system.

5. The method as in claim 1 wherein the amalgamated result is displayed without indicating whether the amalgamated result was derived from the first result or the second result.

6. The method as in claim 1 wherein comparing the received search term includes comparing based on a single input action by a user.

7. The method as in claim 1 wherein comparing the received search term includes comparing the received search term, in response to the single query, with indexed electronic content stored on a first local device and with indexed electronic content stored on a second local device, wherein the first local device and the second local device are networked in a local area network.

8. The method as in claim 1 further comprising creating an index based on the electronic content stored on the local device, wherein comparing the received search term includes comparing the received search term with the index.

9. The method as in claim 8 wherein creating the index includes creating the index at an event pre-designated by a user of the local device.

10. The method as in claim 8 wherein creating the index includes creating the index on-demand in response to an action by a user of the local device.

11. The method as in claim 1 further comprising creating an inverted index based on the electronic content stored on the local device, wherein comparing the received search term includes comparing the received search term with the inverted index.

12. The method as in claim 1 further comprising creating an index based on the electronic content stored on the remote device, wherein comparing the received search term includes comparing the received search term with the index.

13. The method as in claim 12 further comprising creating a local index based on the electronic content stored on the remote device, wherein comparing the received search term includes comparing the received search term with the local index.

14. The method as in claim 12 further comprising creating a local inverted index based on the electronic content stored on the remote device, wherein comparing the received search term includes comparing the received search term with the local inverted index.

15. The method as in claim 1 wherein comparing the received search term includes performing a single comparison of the received search term with both the indexed electronic content stored on the local device and the electronic content stored on the remote device.

16. The method as in claim 1 further comprising, in response to an action of a user of the local device, designating at least one type of indexed electronic content stored on the local device for comparison with the received search term.

17. The method as in claim 1 further comprising, in response to an action of a user of the local device, designating at least one file location of the indexed electronic content stored on the local device for comparison with the received search term.

18. A computer program stored on a computer readable medium for performing a search for both local electronic content and remote electronic content based on a single query, comprising:
   a receiving code segment that causes the computer to receive a single query that includes at least one search term;
   a comparing code segment that causes the computer simultaneously to compare the received search term automatically in response to the single query with indexed electronic content that is stored on a local device to derive a first result and to compare the received search term with electronic content that is stored on a remote device to derive a second result, wherein the local device is a personal computing device;

a combining code segment that causes the computer to combine the first result and the second result into an amalgamated result; and a displaying code segment that causes the computer to display the amalgamated result, wherein the comparing code segment that causes the computer to compare against content stored on the local device and content stored on the remote device causes the computer to perform the comparison automatically in a default state such that the user need not pre-select to cause the computer to compare the receive search term with both the indexed electronic content stored on the local device and the electronic content stored on the remote device.

19. The computer program of claim 18 wherein the personal computing device includes a general purpose computer having an operating system.

20. The computer program of claim 19 wherein the operating system includes a Windows-based operating system.

21. The computer program of claim 19 wherein the operating system includes a Unix-based operating system.

22. The computer program of claim 18 wherein the amalgamated result is displayed without indicating whether the amalgamated result was derived from the first result or the second result.

23. The computer program of claim 18 wherein the comparing code segment causes the computer to compare based on a single input action by a user.

24. The computer program of claim 18 wherein the comparing code segment causes the computer to compare the received search term, in response to the single query, with indexed electronic content stored on a first local device and with indexed electronic content stored on a second local device, wherein the first local device and the second local device are networked in a local area network.

25. The computer program of claim 18 further comprising an index creating code segment that causes the computer to create an index based on the electronic content stored on the local device, wherein the comparing code segment causes the computer to compare the received search term with the index.

26. The computer program of claim 25 wherein the index creating code segment causes the computer to create the index at an event pre-designated by a user of the local device.

27. The computer program of claim 25 wherein the index creating code segment causes the computer to create the index on-demand in response to an action by a user of the local device.

28. The computer program of claim 18 further comprising an index creating code segment that causes the computer to create an inverted index based on the electronic content stored on the local device, wherein the comparing code segment causes the computer to compare the received search term with the inverted index.

29. The computer program of claim 18 further comprising an index creating code segment that causes the computer to create an index based on the electronic content stored on the remote device, wherein the comparing code segment causes the computer to compare the received search term with the index.

30. The computer program of claim 29 further comprising a local index creating code segment that causes the computer to create a local index based on the electronic content stored on the remote device, wherein the comparing code segment causes the computer to compare the received search term with the local index.

31. The computer program of claim 29 further comprising a local index creating code segment that causes the computer to create a local inverted index based on the electronic content stored on the remote device, wherein the comparing code segment causes the computer to compare the received search term with the local inverted index.

32. The computer program of claim 18 wherein the comparing code segment causes the computer to perform a single comparison of the received search term with both the indexed electronic content stored on the local device and the electronic content stored on the remote device.

33. The computer program of claim 18 further comprising, in response to an action of a user of the local device, a designating code segment that causes the computer to designate at least one type of indexed electronic content stored on the local device for comparison with the received search term.

34. The computer program of claim 18 further comprising, in response to an action of a user of the local device, a designating code segment that causes the computer to designate at least one file location of the indexed electronic content stored on the local device for comparison with the received search term.

35. A system for performing a search for both local electronic content and remote electronic content based on a single query, comprising:

means for receiving a single query that includes at least one search term;

means for simultaneously comparing the received search term automatically in response to the single query with indexed electronic content that is stored on a local device to derive a first result and comparing the received search term with electronic content that is stored on a remote device to derive a second result, wherein the local device is a personal computing device;

means for combining the first result and the second result into an amalgamated result; and means for displaying the amalgamated result, wherein the means for comparing against content stored on the local device and content stored on the remote device automatically performs the comparing in a default state such that the user need not pre-select to compare the received search term with both the indexed electronic content stored on the local device and the electronic content stored on the remote device.

36. A method for performing a search for both local electronic content and remote electronic content based on a single query, the method comprising:

receiving a single query that includes at least one search term;

comparing the received search term automatically in response to the single query with indexed electronic content that is stored on a local device to derive a first result and, at a separate time, comparing the received search term with electronic content that is stored on a remote device to derive a second result based on a single input action by a user, wherein the local device is a personal computing device;

combining the first result and the second result into an amalgamated result; and displaying the amalgamated result, wherein comparing against content stored on the local device and content stored on the remote device is performed automatically in a default state such that the user need not pre-select to compare the received search term with both the indexed electronic content stored on the local device and the electronic content stored on the remote device.

37. The method as in claim 36 wherein the personal computing device includes a general purpose computer having an operating system.

38. The method as in claim 37 wherein the operating system includes a Windows-based operating system.

39. The method as in claim 37 wherein the operating system includes a Unix-based operating system.

40. The method as in claim 36 wherein the amalgamated result is displayed without indicating whether the amalgamated result was derived from the first result or the second result.

41. The method as in claim 36 wherein comparing the received search term includes comparing the received search term, in response to the single query, with indexed electronic content stored on a first local device and with indexed electronic content stored on a second local device, wherein the first local device and the second local device are networked in a local area network.

42. The method as in claim 36 further comprising creating an index based on the electronic content stored on the local device, wherein comparing the received search term includes comparing the received search term with the index.

43. The method as in claim 42 wherein creating the index includes creating the index at an event pre-designated by a user of the local device.

44. The method as in claim 42 wherein creating the index includes creating the index on-demand in response to an action by a user of the local device.

45. The method as in claim 36 further comprising creating an inverted index based on the electronic content stored on the local device, wherein comparing the received search term includes comparing the received search term with the inverted index.

46. The method as in claim 36 further comprising creating an index based on the electronic content stored on the remote device, wherein comparing the received search term includes comparing the received search term with the index.

47. The method as in claim 46 further comprising creating a local index based on the electronic content stored on the remote device, wherein comparing the received search term includes comparing the received search term with the local index.

48. The method as in claim 46 further comprising creating a local inverted index based on the electronic content stored on the remote device, wherein comparing the received search term includes comparing the received search term with the local inverted index.

49. The method as in claim 36 wherein comparing the received search term includes performing a single comparison of the received search term with both the indexed electronic content stored on the local device and the electronic content stored on the remote device.

50. The method as in claim 36 further comprising, in response to an action of a user of the local device, designating at least one type of indexed electronic content stored on the local device for comparison with the received search term.

51. The method as in claim 36 further comprising, in response to an action of a user of the local device, designating at least one file location of the indexed electronic content stored on the local device for comparison with the received search term.

52. A computer program stored on a computer readable medium for performing a search for both local electronic content and remote electronic content based on a single query, comprising:

a receiving code segment that causes the computer to receive a single query that includes at least one search term;

a comparing code segment that causes the computer to compare the received search term automatically in response to the single query with indexed electronic content that is stored on a local device to derive a first result and, at a separate time, to compare the received search term with electronic content that is stored on a remote device to derive a second result based on a single input action by a user, wherein the local device is a personal computing device;

a combining code segment that causes the computer to combine the first result and the second result into an amalgamated result; and a displaying code segment that causes the computer to display the amalgamated result, wherein the comparing code segment that causes the computer to compare against content stored on the local device and content stored on the remote device causes the computer to perform the comparison automatically in a default state such that the user need not pre-select to cause the computer to compare the received search term with both the indexed electronic content stored on the local device and the electronic content stored on the remote device.

53. The computer program of claim 52 wherein the personal computing device includes a general purpose computer having an operating system.

54. The computer program of claim 53 wherein the operating system includes a Windows-based operating system.

55. The computer program of claim 53 wherein the operating system includes a Unix-based operating system.

56. The computer program of claim 52 wherein the amalgamated result is displayed without indicating whether the amalgamated result was derived from the first result or the second result.

57. The computer program of claim 52 wherein the comparing code segment causes the computer to compare the received search term, in response to the single query, with indexed electronic content stored on a first local device and with indexed electronic content stored on a second local device, wherein the first local device and the second local device are networked in a local area network.

58. The computer program of claim 52 further comprising an index creating code segment that causes the computer to create an index based on the electronic content stored on the local device, wherein the comparing code segment causes the computer to compare the received search term with the index.

59. The computer program of claim 58 wherein the index creating code segment causes the computer to create the index at an event pre-designated by a user of the local device.

60. The computer program of claim 58 wherein the index creating code segment causes the computer to create the index on-demand in response to an action by a user of the local device.

61. The computer program of claim 52 further comprising an index creating code segment that causes the computer to create an inverted index based on the electronic content stored on the local device, wherein the comparing code segment causes the computer to compare the received search term with the inverted index.

62. The computer program of claim 52 further comprising an index creating code segment that causes the computer to create an index based on the electronic content stored on the remote device, wherein the comparing code segment causes the computer to compare the received search term with the index.

63. The computer program of claim 62 further comprising a local index creating code segment that causes the computer to create a local index based on the electronic content stored on the remote device, wherein the comparing code segment causes the computer to compare the received search term with the local index.

64. The computer program of claim 62 further comprising a local index creating code segment that causes the computer to create a local inverted index based on the electronic content stored on the remote device, wherein the comparing code segment causes the computer to compare the received search term with the local inverted index.

65. The computer program of claim 52 wherein the comparing code segment causes the computer to perform a single comparison of the received search term with both the indexed electronic content stored on the local device and the electronic content stored on the remote device.

66. The computer program of claim 52 further comprising, in response to an action of a user of the local device, a designating code segment that causes the computer to designate at least one type of indexed electronic content stored on the local device for comparison with the received search term.

67. The computer program of claim 52 further comprising, in response to an action of a user of the local device, a designating code segment that causes the computer to designate at least one file location of the indexed electronic content stored on the local device for comparison with the received search term.

68. A system for performing a search for both local electronic content and remote electronic content based on a single query, comprising:
    means for receiving a single query that includes at least one search term;
    means for comparing the received search term automatically in response to the single query with indexed electronic content that is stored on a local device to derive a first result and, at a separate time, comparing the received search term with electronic content that is stored on a remote device to derive a second result based on a single input action by a user, wherein the local device is a personal computing device;
    means for combining the first result and the second result into an amalgamated result; and
    means for displaying the amalgamated result,
    wherein the means for comparing against content stored on the local device and content stored on the remote device automatically performs the comparing in a default state such that the user need not pre-select to compare the received search term with both the indexed electronic content stored on the local device and the electronic content stored on the remote device.

\* \* \* \* \*